United States Patent
Saban et al.

(10) Patent No.: US 9,246,557 B2
(45) Date of Patent: *Jan. 26, 2016

(54) MULTIPLE DATA SERVICES OVER A DISTRIBUTED ANTENNA SYSTEM

(75) Inventors: Ofer Saban, Alexandria, VA (US); Isaac Shapira, Petach Tikva (IL)

(73) Assignee: Corning Optical Communications Wireless Ltd, Airport (IL)

( * ) Notice: Subject to any disclaimer, the term of this patent is extended or adjusted under 35 U.S.C. 154(b) by 925 days.

This patent is subject to a terminal disclaimer.

(21) Appl. No.: 13/440,173

(22) Filed: Apr. 5, 2012

(65) Prior Publication Data

US 2012/0281622 A1 Nov. 8, 2012

Related U.S. Application Data

(63) Continuation of application No. 12/465,288, filed on May 13, 2009, now Pat. No. 8,195,224.

(60) Provisional application No. 61/052,851, filed on May 13, 2008.

(51) Int. Cl.
*H04M 1/00* (2006.01)
*H04B 7/02* (2006.01)

(52) U.S. Cl.
CPC ..................... *H04B 7/024* (2013.01)

(58) Field of Classification Search
None
See application file for complete search history.

(56) References Cited

U.S. PATENT DOCUMENTS

| | | | |
|---|---|---|---|
| 5,153,598 A | 10/1992 | Alves, Jr. | 342/352 |
| 5,311,194 A | 5/1994 | Brown | 342/357 |
| 5,339,184 A | 8/1994 | Tang | 359/124 |
| 5,502,446 A | 3/1996 | Denninger | 342/357 |
| 5,809,395 A | 9/1998 | Hamilton-Piercy et al. | 455/4.1 |
| 6,002,362 A | 12/1999 | Gudat | 342/357.03 |
| 6,031,487 A | 2/2000 | Mickelson | 342/357.12 |
| 6,049,705 A | 4/2000 | Xue | 455/277.1 |
| 6,101,178 A | 8/2000 | Beal | 370/336 |

(Continued)

FOREIGN PATENT DOCUMENTS

| | | | | |
|---|---|---|---|---|
| EP | 0355328 A2 | 2/1990 | | H04B 7/08 |
| EP | 0709974 A1 | 5/1996 | | H04B 7/08 |

(Continued)

OTHER PUBLICATIONS

Written Opinion of the International Searching Authority dated Aug. 20, 2009 for PCT/US2008/001728, 9 pages.

(Continued)

*Primary Examiner* — Anh Tran

(57) ABSTRACT

A system for supporting multiple time division duplexed (TDD) based wireless services or frequency division duplexed (FDD) wireless services on a Distributed Antenna System (DAS). TDD based services use a common clock signal to synchronize the components of the DAS for transmission and reception of TDD signals. The DAS includes a GPS receiver which extracts a timing signal from a GPS signal and distribute the timing signal to components of the DAS to enable synchronization of the components for transmitting and receiving TDD signals. The GPS receiver can be part of the interface that connects a TDD based service to the DAS. The DAS distributes a reference clock signal to the DAS components to maintain zero frequency shift while manipulating with the carrier frequencies of the various wireless services carried by the DAS.

15 Claims, 10 Drawing Sheets

(56) References Cited

U.S. PATENT DOCUMENTS

| | | |
|---|---|---|
| 6,198,432 B1 | 3/2001 | Janky .................... 342/357.14 |
| 6,895,248 B1 | 5/2005 | Akyol et al. ............... 455/452.1 |
| 6,914,539 B2 | 7/2005 | Hoctor et al. ............ 340/870.12 |
| 7,023,382 B1 | 4/2006 | Akano ........................ 342/386 |
| 7,123,895 B2 | 10/2006 | Greenspan et al. ........... 455/311 |
| 7,123,939 B1 | 10/2006 | Bird et al. .................... 455/561 |
| 7,502,686 B1 | 3/2009 | Pemble et al. ................ 701/213 |
| 7,773,578 B2* | 8/2010 | Liu ............................ 370/351 |
| 8,195,224 B2* | 6/2012 | Saban et al. ............... 455/552.1 |
| 2003/0058814 A1 | 3/2003 | Kim ............................. 370/328 |
| 2004/0010368 A1 | 1/2004 | Scott ........................... 701/213 |
| 2004/0100930 A1 | 5/2004 | Shapira et al. ............... 370/338 |
| 2004/0102196 A1 | 5/2004 | Weckstrom et al. ....... 455/456.1 |
| 2004/0201521 A1 | 10/2004 | Alvarez et al. ........... 342/357.12 |
| 2005/0001743 A1 | 1/2005 | Haemerle .................... 340/988 |
| 2005/0242994 A1 | 11/2005 | Cobb et al. .................. 342/386 |
| 2006/0056283 A1 | 3/2006 | Anikhindi et al. ........... 370/208 |
| 2006/0128425 A1 | 6/2006 | Rooyen ..................... 455/552.1 |
| 2006/0262014 A1 | 11/2006 | Shemesh et al. ............. 342/386 |
| 2006/0276227 A1 | 12/2006 | Dravida .................... 455/562.1 |
| 2007/0264009 A1 | 11/2007 | Sabat, Jr. et al. ................. 398/5 |
| 2008/0013481 A1 | 1/2008 | Simons et al. ................ 371/328 |
| 2009/0149221 A1 | 6/2009 | Liu et al. ...................... 455/561 |

FOREIGN PATENT DOCUMENTS

| | | | | |
|---|---|---|---|---|
| EP | 0938204 A1 | 8/1999 | ............. | H04J 13/00 |
| EP | 1085684 A2 | 3/2001 | ............. | H04B 17/00 |
| GB | 2313020 A | 11/1997 | ............. | H04B 7/06 |
| JP | 5-252559 | 9/1993 | ............. | H04Q 7/04 |
| JP | 5-327569 | 12/1993 | ............. | H04B 7/04 |
| JP | 5-327576 | 12/1993 | ............. | H04B 7/26 |
| WO | WO96/13102 | 5/1996 | ............. | H04B 7/02 |
| WO | WO98/04054 | 1/1998 | ............. | H04B 7/04 |
| WO | WO02/091618 A1 | 11/2002 | ............. | H04B 7/00 |
| WO | WO2004/107783 A1 | 12/2004 | ............. | H04Q 7/30 |
| WO | WO2006/105185 A2 | 10/2006 | ............. | H04B 1/38 |
| WO | WO2006/136811 A1 | 12/2006 | ............. | H04B 10/12 |
| WO | WO2007/133630 A2 | 11/2007 | ............. | C01F 7/02 |
| WO | WO2009/138876 A3 | 11/2009 | ............. | H01Q 21/06 |

OTHER PUBLICATIONS

Written Opinion of the International Searching Authority dated Jun. 6, 2008 for PCT/US2008/001728, 8 pages.

Written Opinion of the International Searching Authority dated Jul. 3, 2008 for PCT/US07/11297, 7 pages.

International Search Report dated Jun. 6, 2008 for PCT/US2008/001728, 6 pages.

International Search Report dated Jun. 6, 2008 for PCT/US07/11297, 4 pages.

USPTO Non-Final Office Action dated Sep. 9, 2011 for U.S. Appl. No. 12/465,288, 12 pages.

Corning Cable Systems LLC, Response to Non-Final Office Action dated Jan. 1, 2012, 10 pages.

* cited by examiner

MULTIPLE DATA SERVICES OVER A DISTRIBUTED ANTENNA SYSTEM

CROSS-REFERENCE TO RELATED APPLICATIONS

This application is a continuation of U.S. patent application Ser. No. 12/465,288 filed on May 13, 2009 now U.S. Pat. No. 8,195,224, the content of which is relied upon and incorporated herein by reference in its entirety, and the benefit of priority under 35 U.S.C. §120 is hereby claimed, which claims the benefit of priority under 35 U.S.C. §119 of U.S. Provisional Patent Application Ser. No. 61/052,851, filed on May 13, 2008, the content of which is relied upon and incorporated herein by reference in its entirety.

This application is related to the following U.S. patent application Ser. No. 11/958,062 filed Dec. 17, 2007, Ser. No. 12/016,459 filed Jan. 18, 2008, Ser. No. 12/016,477 filed Jan. 18, 2008, Ser. No. 12/033,226 filed Feb. 19, 2008 and Ser. No. 12/033,252 filed Feb. 19, 2008, which are hereby incorporated by reference in their entirety.

STATEMENT REGARDING FEDERALLY SPONSORED RESEARCH

Not Applicable

REFERENCE TO MICROFICHE APPENDIX

Not Applicable

BACKGROUND

1. Technical Field of the Invention

The present invention is directed to Distributed Antenna Systems (DASs) and more particularly, to methods and systems for supporting multiple wireless data services on a DAS.

Distributed Antenna Systems are used to provide or enhance coverage for wireless services such as Public Safety, Cellular Telephony, Wireless LAN and Medical Telemetry inside buildings and over campuses. The general architecture of a DAS is depicted in FIG. 1.

A single DAS can serve a single wireless service or a combination of many wireless services operating over multiple bands. With respect to each wireless service served by the DAS, the Aggregation Configuration of the wireless service can be characterized as non-aggregated or aggregated. In a non-aggregated configuration, there is a 1:1 relationship between DAS antennae and Base Transceiver Stations (BTS) or Transmitter/Receiver units for that wireless service. In an aggregated configuration, each BTS unit for a given wireless service is associated with multiple DAS antennae through a hierarchy of aggregation. For example, in FIG. 2, Services A, B, and C are aggregated and Services D1, D2, and D3 are non-aggregated. Services such as D1, D2, and D3 can be aggregated as well. The ability to aggregate services is typically a function of the remote wiring closet equip. Typically, wireless LAN services are arranged in a non-aggregated configuration when using a DAS while cellular services are typically arranged in an aggregated configuration.

One desired characteristic of a multi-service DAS is that it can use a single antenna to radiate and receive the signals for all services and frequency bands supported by the DAS. Such an antenna would need to cover (i.e. have acceptable performance) in all frequency bands of interest and is commonly referred to as a Broadband Antenna. An example of a supported frequency range for a DAS antenna would be 400 MHz-6 GHz. To provide MIMO based services, a MIMO antenna which includes multiple antenna elements at a common location can be used.

In referring to the signal flows in DAS systems, the term Downlink signal refers to the signal being transmitted by the source transmitter (e.g. cellular base station) through an antenna to the terminals and the term Uplink signal refers to the signals being transmitted by the terminals which are received by an antenna and flow to the source receiver. Many wireless services have both an uplink and a downlink, but some have only a downlink (e.g. a mobile video broadcast service) or only an uplink (e.g. certain types of medical telemetry).

2. Description of the Prior Art

In addition to providing cellular and other wireless services, these DAS can be used to provide Time Division Duplexed (TDD) based services such as WiFi (IEEE 802.11 and similar standards), ZigBee, Blue Tooth, WiMAX, Advanced Wireless Services (AWS) as well as Frequency Division Duplex (FDD) based services such as WiMAX, Personal Communication Services (PCS) and AWS. When a DAS used to provide these services, either the Main wiring closet or remote wiring closet equipment needs an interface to connect the service network to the DAS. These source interfaces are commonly referred to as a Macro/Micro/Pico/Femto BTS or Access Point (AP) etc. For each additional wireless service that is connected to the DAS a separate, dedicated BTS is needed. Thus, it is difficult to support multiple service networks on a DAS because many expensive BTS devices are needed.

SUMMARY

One of the benefits of a DAS is that it can allow many different wireless services to be provided over a common physical infrastructure (wiring, wiring closet units, antenna units and other physical components). Thus, once the physical infrastructure is installed, the same physical infrastructure can be used to support additional wireless services and avoids the expense of additional equipment and the installation of that equipment. In addition, operational benefits include lower energy costs and potentially lower maintenance costs.

Where a DAS has been installed in a facility, it can be desirable to add other wireless services including TDD based services such as WiFi, WiMAX, AWS, ZigBee, Blue Tooth and FDD based services such as WiMAX, PCS and AWS. For each service, an interface can be used to connect the service network to the DAS. In addition, a GPS receiver (or an envelop detector) can be connected to the DAS and used to provide a 1 pulse per second (1 pps) signal to synchronize any and all of the components of the DAS for transmitting and receiving the wireless signals. The 1 pps signal can be distributed over the DAS to any or all of the wiring closet units and to the antenna units to enable them to be synchronized for transmission and reception of the wireless signal.

In accordance with one embodiment of the invention, the DAS includes a BTS coupled to one or more wiring closet or combining units, each wiring closet unit being coupled to one or more antenna units for providing a wireless service. The antenna units can include passive or active antenna elements or a combination of both. The DAS can be coupled to a first interface which is coupled to a first wireless network to enable the DAS to carry the first wireless network signals over the DAS and the DAS can also be coupled to a second interface which is coupled to a second wireless network to enable the DAS to carry the second wireless network signals over the DAS. All the active elements in the DAS can be monitored or configured by a point to multipoint centralized management system, the management system can transmit and receive point to multipoint signals to and from any of the addressed elements attached to the DAS. The DAS can also be coupled to a global positioning system (GPS) receiver and adapted to receive the 1 pps clock signal from one or more GPS satellites and the DAS is adapted and configured to distribute the 1 pps signal to any or all the BTS, wiring closet or combining units and antenna units of the DAS.

In some embodiments of the invention, the GPS receiver can be integrated with one or more of the interfaces. In alternative embodiments, the GPS receiver can be integrated with the BTS. In alternative embodiments, the GPS receiver can be a separate component connected to any one of the BTS, the first interface, the second interface, the wiring closet units, combining units or the antenna units. In an alternative embodiment, the first interface can include a BTS. In an alternative embodiment, the second interface can include a BTS.

In accordance with another embodiment of the present invention, the DAS can include a BTS coupled to one or more wiring closet units, each wiring closet unit being coupled to one or more antenna units for providing a first TDD wireless service. The DAS can be coupled to a second interface which is coupled to a second TDD network to enable the DAS to carry the second TDD network signals over the DAS. The DAS can also be coupled to a global positioning system (GPS) receiver and adapted to receive the 1 pps clock signal from one or more GPS satellites and the DAS can be adapted and configured to distribute the 1 pps signal to any or all the BTS, wiring closet units and antenna units of the DAS.

In some embodiments of the invention, the GPS receiver can be integrated in the BTS. In alternative embodiments, the GPS can be integrated into the second interface. In alternative embodiments, the GPS receiver can be a separate component connected to any one of the BTS, the second interface, the wiring closet units or the antenna units. In an alternative embodiment, the second interface can include a BTS.

In some embodiments of the invention, the GPS RF signal (e.g., 1.5 Ghz) can be, for example, multiplexed with the other services, and distributed over the DAS without extracting the 1 PPS signal. The GPS RF signal can be de-multiplex and fed to the BTS that includes a GPS receiver or other external GPS receiver at the remote or antenna location.

In accordance with one embodiment of the invention, instead of a GPS receiver, the DAS can include an envelop detector adapted to extract or recover a 1 pps signal from a TDD signal received by one of the interfaces (for example: Micro cells, Pico cells or Femto cells). The envelop detector can be adapted and configured to extract or recover the 1 pps signal and transfer it to the DAS for distribution to any or all of the components of the DAS including the BTSs, the other interfaces (including other Pico or Femto cells), the wiring closet or combining units, and the antenna units.

In accordance with one embodiment of the invention, the DAS can be adapted to distribute the 1 pps signal to any and all components of the DAS. The GPS receiver can include or be coupled to a modem or modulator adapted for modulating the 1 pps signal onto a carrier signal and transmitting the carrier signal to any and all components of the DAS. The components of the DAS, including the BTS, the main closet unit, the wiring closet units and the antenna units can include or be coupled to a modem or demodulator adapted for demodulating and extracting the 1 pps signal from the carrier signal and transferring the 1 pps signal to any and all components of the DAS for use in transmitting and receiving TDD signals. The 1 pps signal can be carried on a carrier signal that is distributed over the physical infrastructure of the DAS. Each antenna unit can include a signal processor adapted and configured to regenerate, extract or recover the 1 pps signal from the carrier signal. The carrier signal can be generated at any frequency that the DAS is capable to deliver preferably on non occupied bands, for example, for wired links, using bands below 100 MHz. such as the 20-50 MHz bands and for optical links, using bands over 1 GHz, such as the 1.2-1.7, 2.7-3.0 GHz bands.

In accordance with one embodiment of the invention, the GPS receiver can be coupled to one or more of the wiring closet units and adapted to transfer the 1 pps signal to one or more of the wiring closet units. The wiring closet units can transmit the 1 pps signal over the (wire and/or optical) cable infrastructure connecting the components of the DAS. The 1 pps signal can be used by the components of the DAS for transmitting and receiving TDD signals.

In accordance with an embodiment of the invention, the DAS can include a component for generating a reference clock signal, such as an OCXO clock or a pilot clock signal. Typically the reference clock signal will be a 10 Mhz-20 Mhz clock signal. The reference clock signal can be transferred to any and all of the components of over the DAS. The reference clock signal can carried on a 1.5 Ghz-2.0 Ghz carrier signal that is distributed over the physical infrastructure of the DAS. Each component of the DAS can include a Phase Lock Loop (PLL) based component that is adapted and configured to regenerate, extract or recover the reference clock signal from the carrier signal. In some embodiments of the invention, the clock can be delivered at a high frequency (1.5-3 GHz) in order to reduce the potential to introduce noise or interferences to other services and particularly where the communication medium includes an optical communication medium. In some embodiments of the invention, where the communication medium includes a coaxial cable the original clock frequency 10-20 MHz can be used to deliver the reference clock signal.

One object of the invention is to provide a DAS which can support many wireless services at the same time.

Another object of the invention is to provide a DAS which can support many wireless services at the same time at a low cost.

Another object of the invention is to provide a DAS which can support many TDD and FDD based wireless services at the same time.

Another object of the invention is to provide a DAS which can support many TDD and FDD based wireless services at the same time at a low cost.

Another object of the invention is to provide a DAS which can support many TDD based wireless services at the same time using the same TDD amplifier where all of the TDD based wireless services can to be synchronize to the same TDD timing signal.

The present invention can be applied to single service and multi-service DAS, in both aggregated and non-aggregated configurations and to both downlink and uplink signal flows.

These and other capabilities of the invention, along with the invention itself, will be more fully understood after a review of the following figures, detailed description, and claims.

DETAILED DESCRIPTION OF PREFERRED EMBODIMENTS

The present invention is directed to a method and system for carrying wireless services over a distributed antenna systems (DASs). In accordance with one embodiment of the invention, the DAS includes an interface that connects each wireless service to the DAS and enables the wireless service signals to be transferred through the DAS. The system also includes a GPS receiver (or envelop detector) which is adapted and configured to receive a 1 pulse per second (1 pps) synchronization signal used to control the timing of the wireless signals, such as TDD based signal. The DAS can be adapted and configured to transfer the 1 pps signal to various components of the DAS to enable the DAS to support the transfer of the wireless signals through the DAS. The system can also include a reference clock generator for generating a reference clock signal. The DAS can be adapted and configured to distribute the reference clock signal to any and all components of the DAS. The reference clock signal can be used to synchronize the frequency conversion components of the DAS that change the frequency of the carrier signals (up-shifting or down-shifting the carrier frequency) of the signals carried through the DAS.

The DAS can also utilize a control channel to send control and configuration information to and receive status information from each managed component of the DAS. The control channel can utilize one or more of the unutilized frequency bands or channels of the DAS to send and receive signals used to carry information between components of the DAS. The control channel can use different frequency bands or channels depending on the communication medium used to convey the signals. For example, the control channel can use a channel in the 80 MHz band over wired media and a channel in the 400 MHz band over optical media. The DAS can use frequency-shift keying (FSK) or amplitude-shift keying (ASK) as the modulation scheme to carry data over the DAS. A DAS management system connected to the main wiring closet or the remote wiring closet can communicate with each managed component of the DAS using a unique address assigned to the component.

In accordance with the invention, the DAS can provide a single wireless service or multiple wireless services. With respect to systems providing multiple wireless services, the invention can provide a 1 pps timing signal and/or a 10-20 Mhz clock signal to any or all of the components of the DAS that are used to transfer the signals used by wireless services. In some embodiments of the invention, the 1 pps timing signal can be derived from a GPS signal using a GPS receiver. In alternate embodiments of the invention, the 1 pps timing signal can be detected or derived from one or more of the TDD signals using a hardware or software envelop detector system. The invention can use software in its implementation and the method according to the invention can be software controlled and completely automated.

Figure 1:
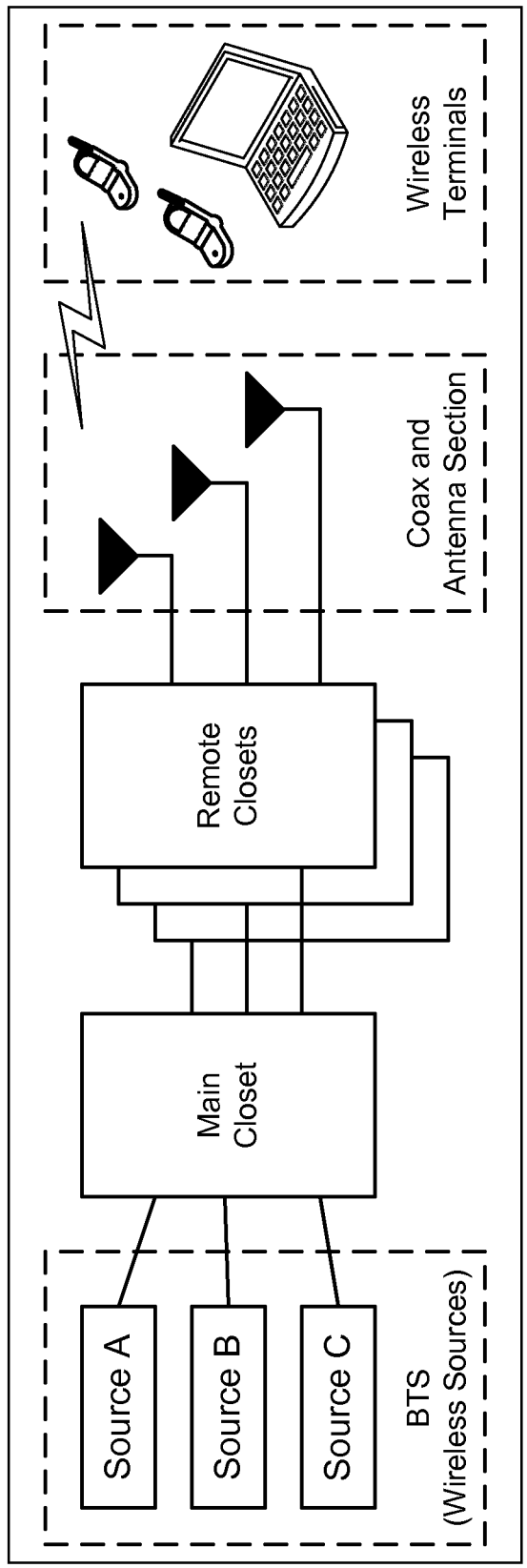
FIG. 1 is a block diagram of a DAS according to the invention.
Figure 2:
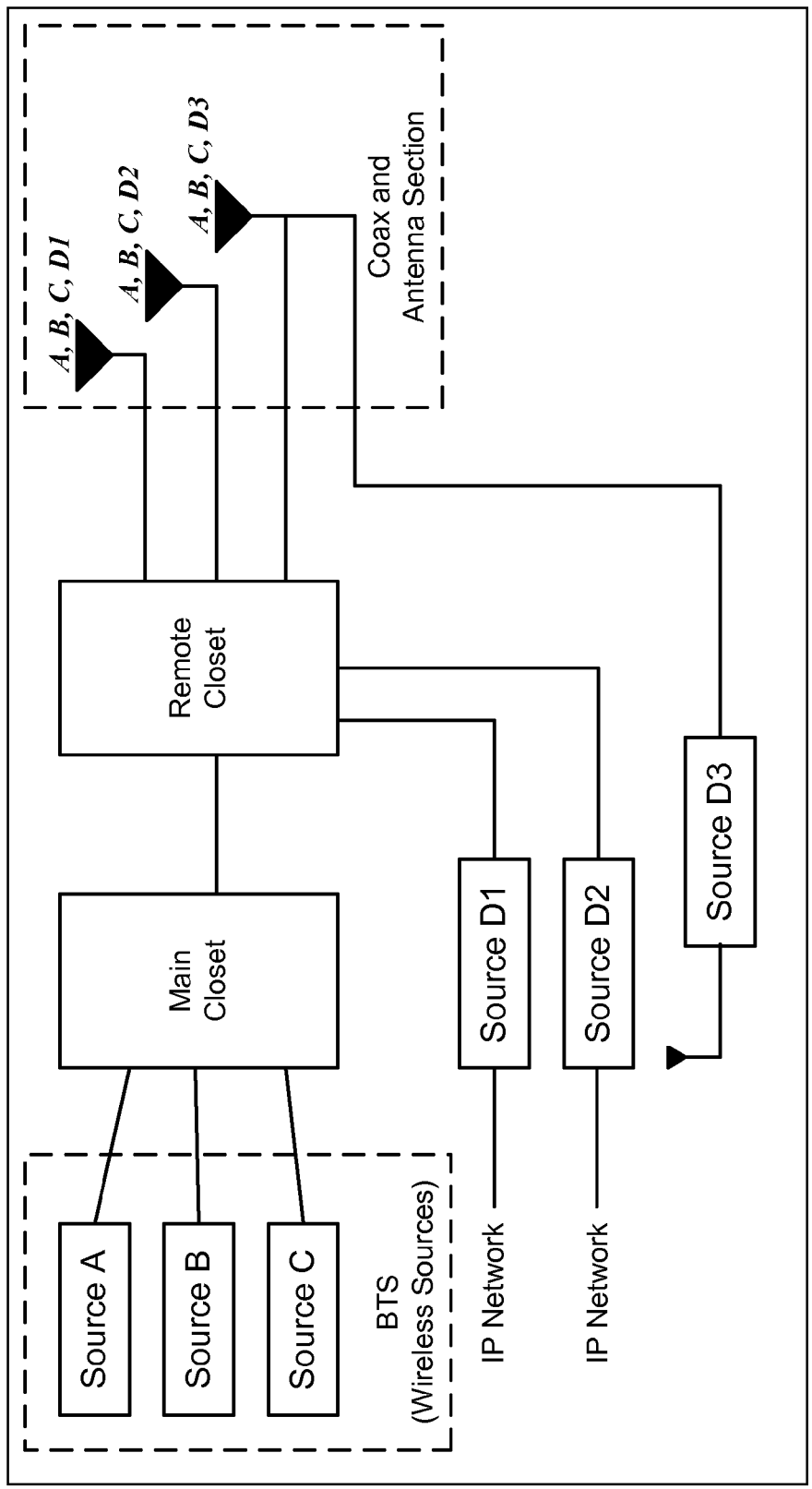
FIG. 2 is a block diagram of a DAS according to the invention.
Figure 3:
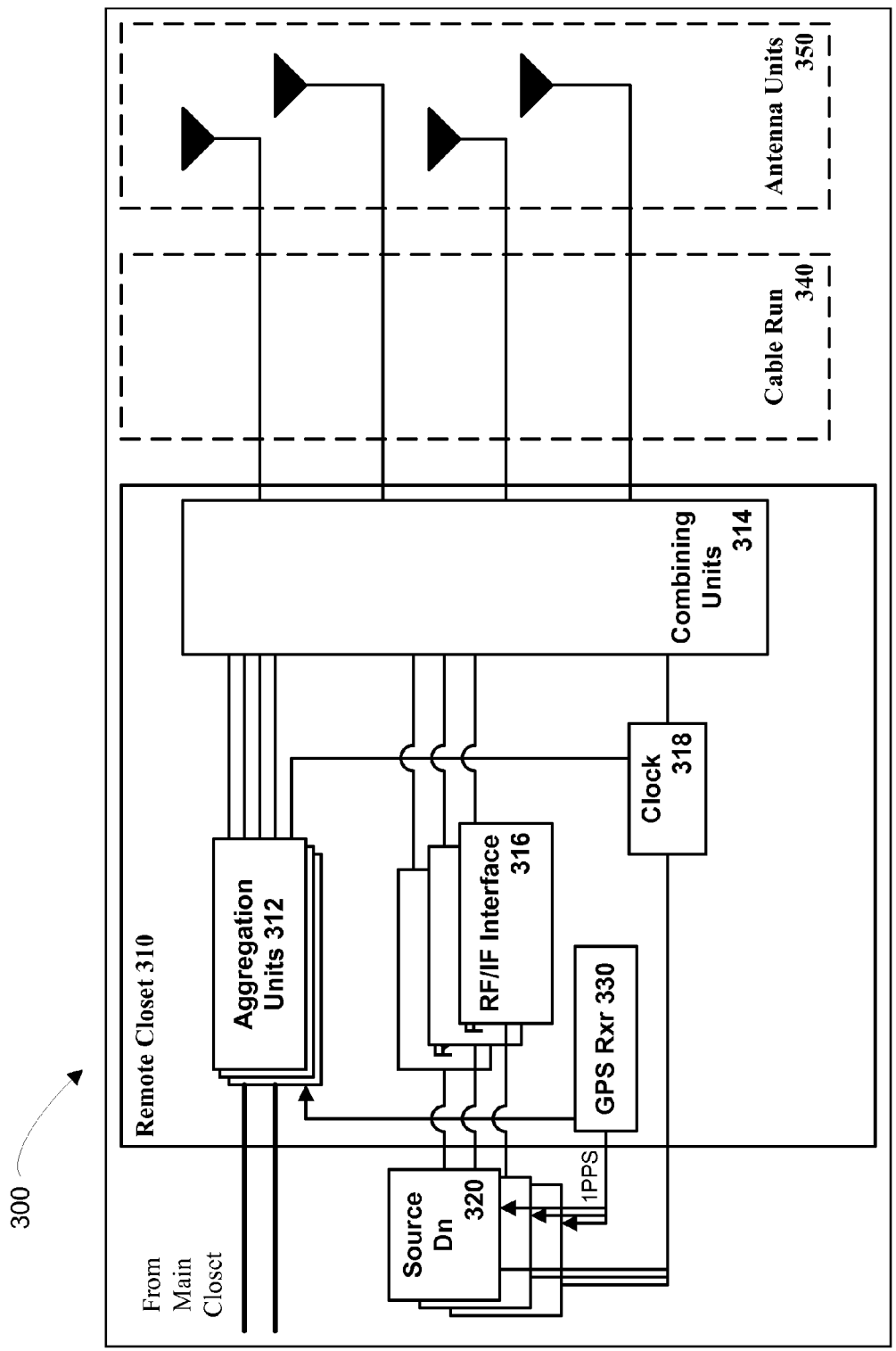
FIG. 3 is a block diagram of a DAS according to one aspect of the invention.

As shown in FIG. 3, the system 300 according to the invention can include in a remote wiring closet 310, one or more aggregation units 312, one or more wiring closet or combining units 314, one or more RF/IF interfaces 316, and one or more wireless network service interfaces, Sources Dn 320. The system 300 can also include one or more BTS systems (shown in FIG. 2) providing wireless services, a main closet unit (shown in FIG. 2) for distributing signals corresponding to the wireless services, one or more cable runs 340 and one or more antenna units 350. The system 300 can also includes a 1 pps timing signal. As shown in FIG. 3, the system 300 can include a GPS receiver 330 which is adapted to receive a GPS signal and extract a 1 pps timing signal, for example, from the 1.5 GHz GPS timing signal (the GPS signal can be obtained from an external antenna directly or from the main closet, multiplexed with the other services). The GPS receiver 330 can be connected to the DAS and the DAS can be adapted to transfer the 1 pps timing signal to any and all components of the DAS. In some embodiments of the invention, the GPS timing signal (either 1 pps or 1.5 GHz) can be connected to that DAS at the main wiring closet and distributed to any and all remote wiring closet units 314 for distribution to the antenna units. In other embodiments of the invention, a separate GPS timing signal source can be connected to each remote wiring closet unit 314 for distribution to the antenna units 350, although all remote wiring closet units 314 need not be connected to a GPS timing signal source. Also shown in FIG. 3, the system 300 can include a reference clock source 318 which can be used to generate a reference timing signal for up converting or down converting (i.e. changing the frequency of) the carrier signals used to transfer the various services through of the DAS.

In accordance with one embodiment of the invention, the GPS receiver 330 can be connected to one or more of the aggregation units 312. Each aggregation unit can received one or more signals corresponding to two or more wireless services and can combine the signals from two or more wireless services for transfer over the cable run 340 to one or more antenna units 350. Each aggregation unit 312 connected to the GPS receiver can include a modem or modulator for modulating the 1 pps signal onto a predefined carrier signal which can be transmitted to other components of the DAS. The carrier signal can be, for example, a 100 Mhz carrier signal that is transmitted over the physical infrastructure (i.e., the cables and components) of the DAS. For example, one or more of the antenna units 350 can include a modem or demodulator for demodulating the 1 pps timing signal and recovering it from the predefined carrier signal. The 1 pps timing signal can be used by the TDD switching mechanisms, the duplexers and deduplexers of the antenna units to synchronize the operation of some or all of the components of the antenna unit with the TDD signal. Alternatively, the DAS can include additional cabling and physical components for transferring the 1 pps timing signal to other components of the DAS.

The GPS receiver 330 can also be connected to the network service interfaces, Source Dn 320 to provide the 1 pps signal for use in processing the network service signals. Alternatively, the GPS receiver 330 can provide the 1.5 Ghz GPS signal directly to the Source Dn 320 which can use an internal GPS receiver to extract or recover the 1 pps signal by de-multiplexing the GPS signal provided by the other services that run over the DAS from the main wiring closet. Alternatively, the GPS receiver can be replaced by an envelope detector system which processes or analyzes the TDD signal received by Source Dn 320 and extracts or recovers the 1 pps signal. The 1 pps signal determined by the envelop detector system can be further distributed to all the components of the DAS as described herein. Alternatively, the 1.5 GHz or 1 pps GPS timing signal can be provided at the main wiring closet and distributed to each component over the DAS. The components can include a demultiplexer to demultiplex the GPS timing signal from the other services for use by the component.

Figure 7:
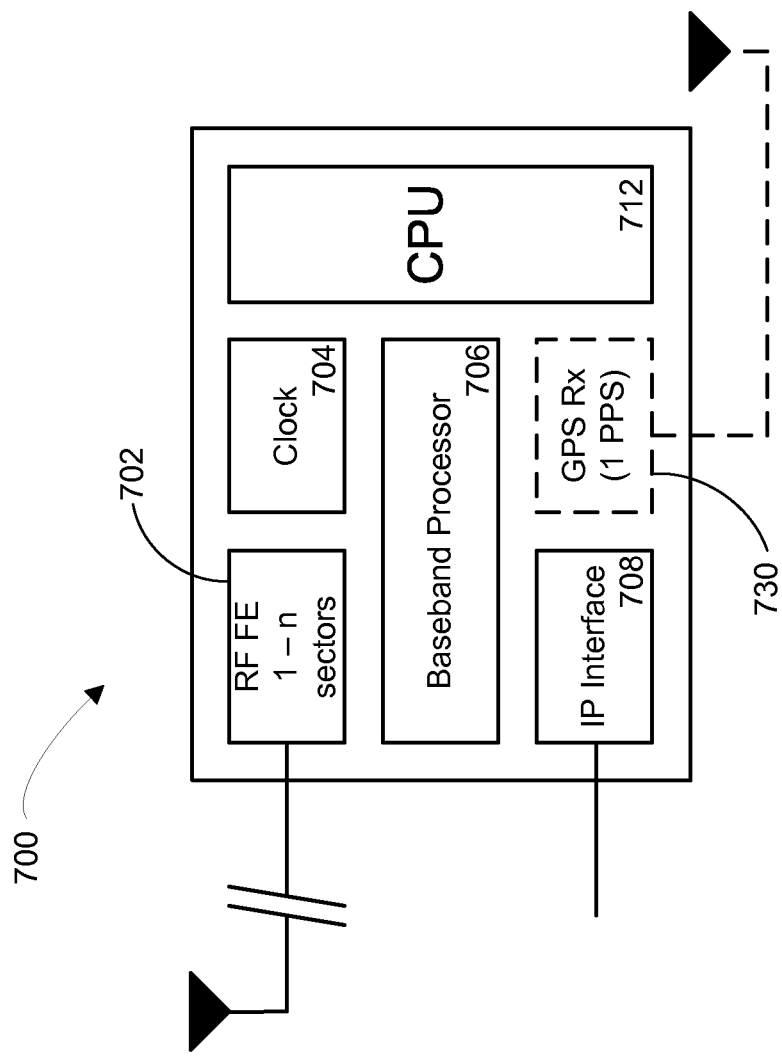
FIG. 7 is a block diagram of an interface according to one aspect of the invention.

While FIG. 3 shows the GPS receiver 330 as a separate component, the GPS receiver 330 can be integrated with the Source Dn 320 as shown in FIG. 7. In addition, the 1 pps timing signal can be used to provide a timing signal for many different TDD and other synchronized services. The 1 pps timing signal can be converted to a different frequency and used to synchronize other wireless services that require a synchronized clock signal, including non-TDD based wireless services.

The reference clock re generator source 318 can include a phase locked loop (PLL) and generate a reference timing signal that can be distributed over the associated DAS components and BTS. The reference timing signal can be, for example, a 10-20 MHz timing signal. The clock can be distributed over the DAS at high frequency, 1-3 GHz, in order to avoid the introduction of noise or interference in other services provided by the DAS.

Figure 4:
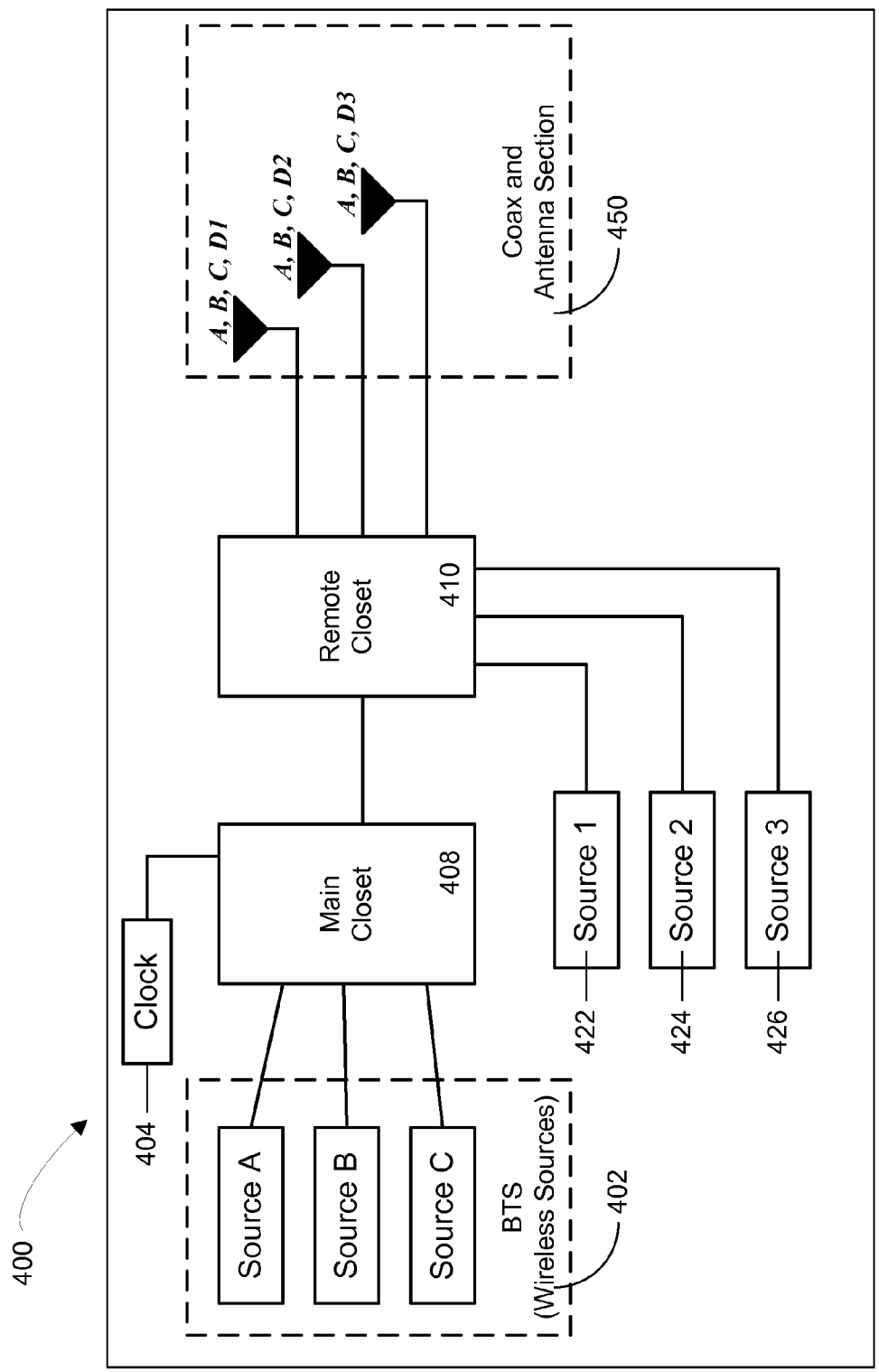
FIG. 4 is a block diagram of a DAS according to one aspect of the invention.

FIG. 4 shows a system 400 according to an alternate embodiment of the invention. Similar to FIG. 3, system 400 can include one or more BTS systems 402 providing wireless services, a main closet unit 408 for distributing signals corresponding to the wireless services to wiring closet units, a remote wiring closet 410 including one or more wiring closet units that can combine the signals from two or more wireless services, Source 1 interface 422, Source 2 interface 424, and Source 4 interface 426 which provide interfaces to other wireless services provided by the DAS. The system 400 can also include a reference clock source 404 which produces a reference timing signal. As shown in FIG. 4, the system 400 can include a reference clock source 404 which is adapted to produce a predefined reference timing signal which can be fed into the main wiring closet and distributed over DAS. The system 400 can also include a GPS receiver (not shown) that can be connected to one or more of the BTS systems or wireless network service sources Source 1 422, Source 2 424, Source 3 426 of the DAS and the DAS can be adapted to transfer the 1 pps timing signal to any and all components of the DAS as described herein. The GPS receiver can be a separate component or it can be integrated with one or more of the components of the system 300. Each of the wireless service sources Source 1 422, Source 2 424, Source 3 426 can be connected by wire or by a wireless connection (repeater not shown) to a network that carries the network traffic for that wireless service.

Figure 5:
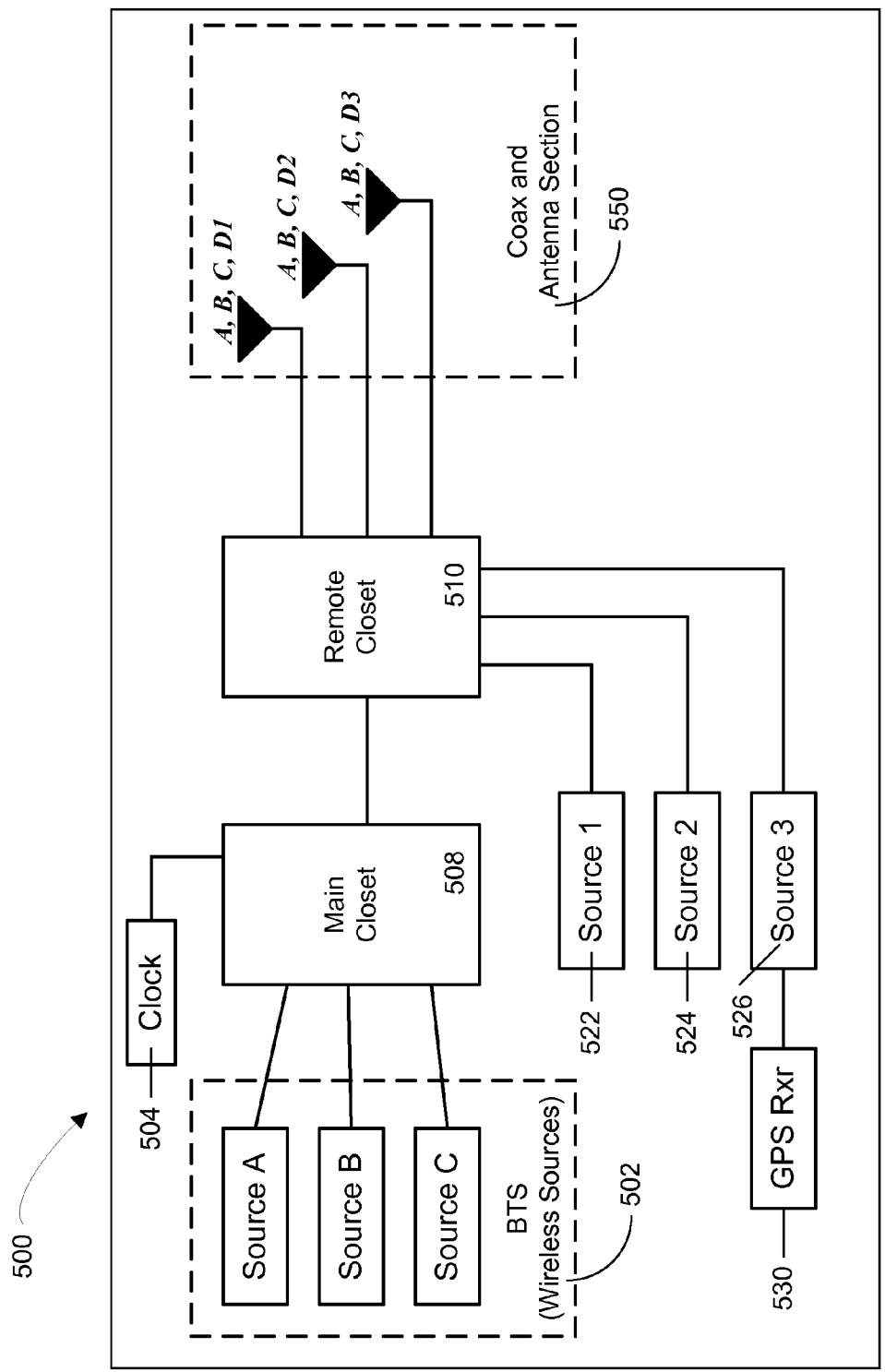
FIG. 5 is a block diagram of a DAS according to one aspect of the invention.

FIG. 5 shows a DAS 500 according to an alternate embodiment of the invention. Similar to FIGS. 3 and 4, DAS 500 can include one or more BTS systems 502 providing wireless services, a main closet unit 508 for distributing signals corresponding to the wireless services to wiring closet units, a remote wiring closet 510 including one or more wiring closet units that can combine the signals from two or more wireless services, Source 1 522, Source 2 524, and Source 3 526 which provide interfaces to other wireless services provided over the DAS. The system 500 can also include a reference clock source 504 which produces a reference timing signal. The system 500 can also include a 1 pps timing signal. As shown in FIG. 5, the system 500 can include a GPS receiver 530 which is adapted to receive a GPS signal an extract a 1 pps timing signal. The GPS receiver 530 can be connected to one or more of the Source 1, 2 or 3 units 522, 524, 526 of the DAS and the DAS can be adapted to transfer the 1 pps timing signal to any and all components of the DAS as described herein. While FIG. 5 shows the GPS receiver 530 as a separate component, a GPS receiver 530 can be integrated with one or more of the Source 1, 2, 3 units 522, 524, and 526 as shown in FIG. 7 below.

Figure 6:
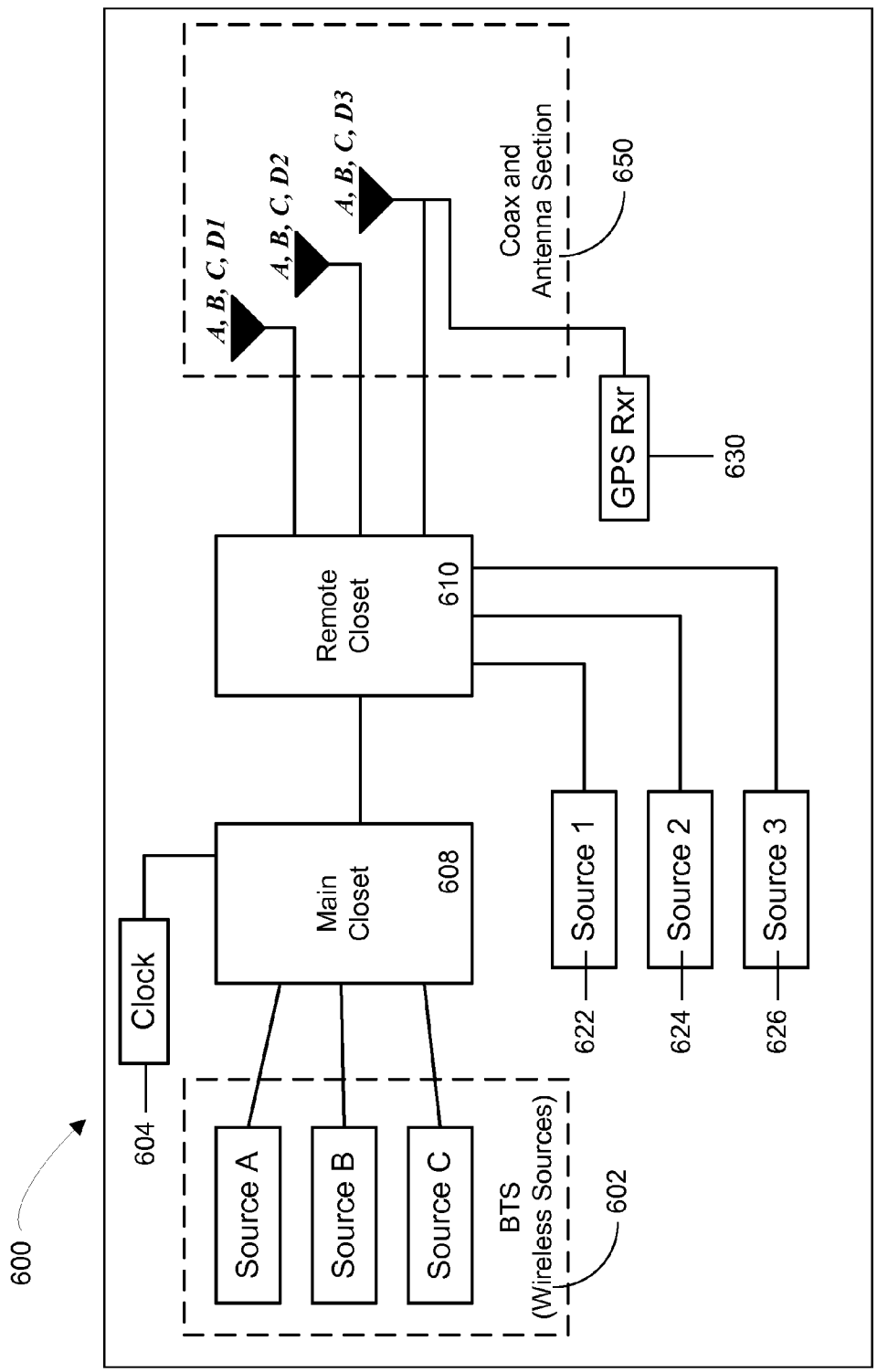
FIG. 6 is a block diagram of a DAS according to one aspect of the invention.

FIG. 6 shows a DAS 600 according to an alternate embodiment of the invention. Similar to FIGS. 3, 4 and 5, DAS 600 can include one or more BTS systems 602 providing wireless services, a main closet unit 608 for distributing signals corresponding to the wireless services to wiring closet units, a remote wiring closet 610 including one or more wiring closet units that can combine the signals from two or more wireless services, Source 1 622, Source 2 624, and Source 3 626 which can provide interfaces to other wireless services provided over the DAS. The system 600 can also include a reference clock source 604 which produces a reference timing signal. The system 600 also includes a 1 pps timing signal. As shown in FIG. 6, the system 600 can include a GPS receiver 630 which is adapted to receive a GPS signal an extract a 1 pps timing signal. The GPS receiver 630 can be connected to one or more of the antenna units 650 of the DAS and the DAS 600 can be adapted to transfer the 1 pps timing signal to any and all components of the DAS 600 as described herein. While FIG. 6 shows the GPS receiver 630 as a separate component, a GPS receiver 630 can be integrated with one or more of the antenna units.

FIG. 7 shows a block diagram of a Source or interface unit 700 in accordance with an embodiment of the present invention. The interface unit 700 can include a radio frequency front end (RF FE) 702, a reference clock source 704, a broad band signal processor (BB Processor 706, an Internet Protocol Interface (IP Interface) 708 and a CPU 712. Interface unit 700 can optionally include a GPS receiver 730 for receiving GPS signals and producing a 1 pps timing signal. The RF FE 702 can be connected either directly or indirectly to one or more antennae and adapted for transmitting and receiving one or more RF signals. The interface unit 700 can include one or more different types of RF FEs 702, including a MIMO RF FE, a CDMA RF FE, a TDD RF FE and a GSM RF FE. The RF FE 702 can be connected to BB Processor 706. The BB processor 706 can be used to process the signals transmitted and received by the RF FE 702. The BB Processor can be connected to the IP Interface 708. The IP interface 708 can be used to connect the interface Unit 700 to an IP network which carries the wireless service signals to be transferred over the DAS. The CPU 712 can be connected to the RF FE 702, the BB Processor 706, the IP Interface 708 to monitor and/or control the operation of each of the components of the interface unit 700.

As shown in FIG. 7, the interface unit 700 can optionally include a GPS receiver 730 and be adapted to receive the GPS signals and extract or recover the 1 pps timing signal. The GPS receiver 730 can be connected to a separate antenna and be adapted to provide the 1 pps timing signal to an external other components of the interface unit 700 as well as components of the DAS.

As shown in FIG. 7, the interface unit 700 can include a reference clock source 704. The reference clock source 704 can be used to provide a reference timing signal for converting baseband and intermediate frequency signals to or from radio frequency signals as they are transmitted or received by the components of the DAS. Reference clock source 704 can be a precision clock circuit that includes a phase lock loop. Alternatively, the reference clock source 704 can be a component that is connected to the DAS and receives the reference clock signal distributed over the DAS and extracts the reference timing signal for use by the interface unit 700.

Figure 8:
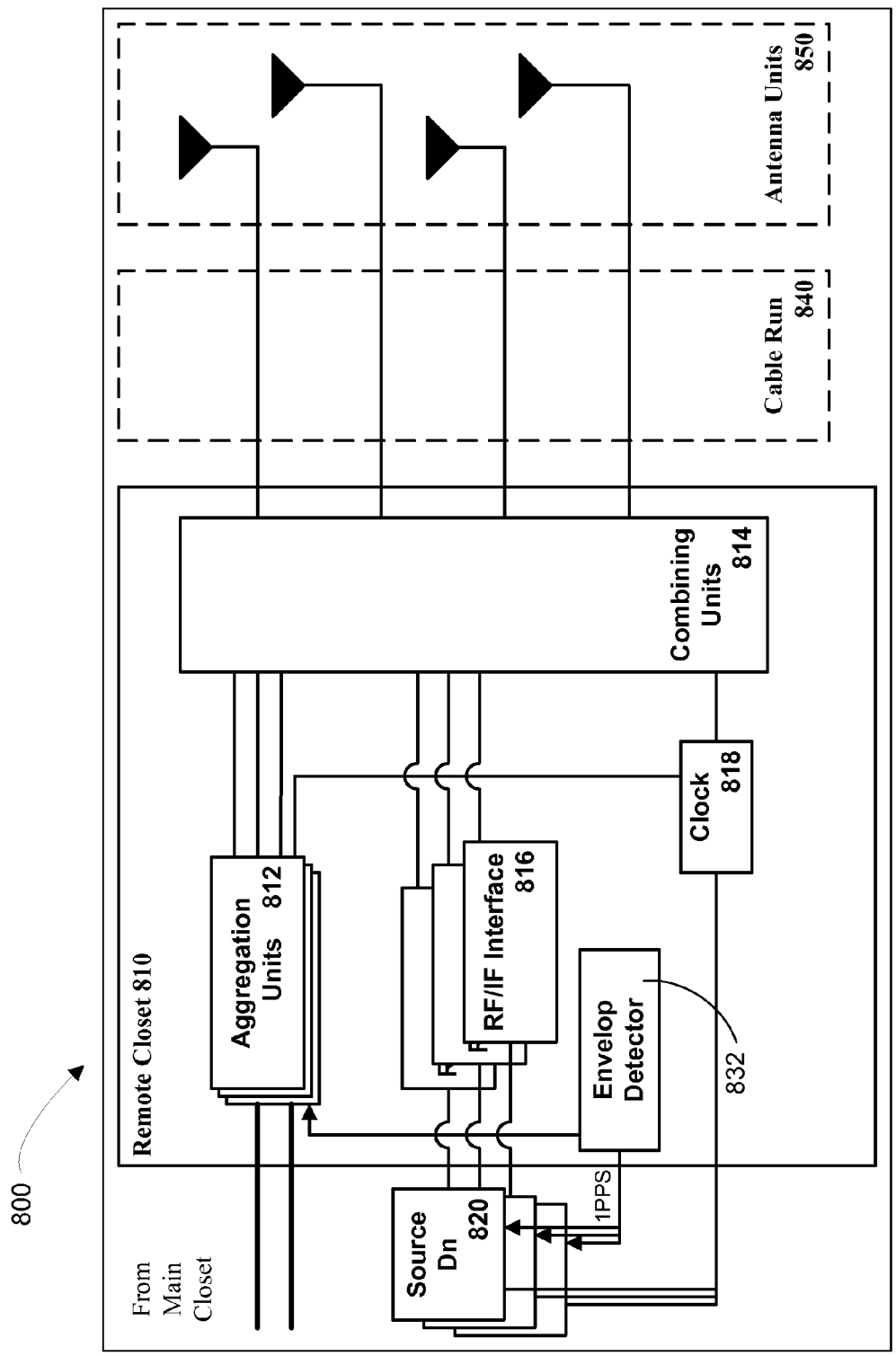
FIG. 8 is a block diagram of a DAS according to one aspect of the invention.

FIG. 8 shows a DAS 800 according to an alternate embodiment of the invention. Similar to FIGS. 3, 4, 5 and 6, DAS 800 can include one or more BTS systems providing wireless sources, a main closet unit for distributing signals to wiring closet units, a remote wiring closet 810 including one or more wiring closet or combining units 814, and Source Dn 820, which can provide interfaces to other wireless services provided over the DAS. The system 800 can also include a reference clock source 818 which produces a reference timing signal. The DAS 800 also includes a 1 pps timing signal. As shown in FIG. 8, the system 800 can include a detector 832 which is adapted to receive a TDD signal and extract a 1 pps timing signal. The detector 832 can be connected to one or more of the Source Dn units, 820 of the DAS 800, one or more of the wiring closet or combining units 814 of the DAS 800 or one or more of the antenna units 850 of the DAS 800. The DAS 800 can be adapted to transfer the 1 pps timing signal to any and all components of the DAS 800 as described herein. While FIG. 8 shows the detector 832 as a separate component, a detector 832 can be integrated with one or more of the Source Dn units 820 of the DAS 800, one or more of the wiring closet units 814 of the DAS 800 or one or more of the antenna units 850. The input to the envelop detector 832 can be any one of the Source Dn units 820 and that input will serve as the primary source of the timing signal from which all of the other components and TDD sources will be synchronized.

In operation of one embodiment of the invention, one or more of the Source interface units 822, 824, 826 receives one or more TDD signals and the detector 832 processes one or more of the TDD signals to determine the timeslot boundaries and determine a timing signal. In one embodiment of the invention, the timing signal is a 1 pps timing signal. In one embodiment of the invention, the detector 832 can include an envelope detector for detecting the timing envelope of one or more of the TDD signals.

Figure 9:
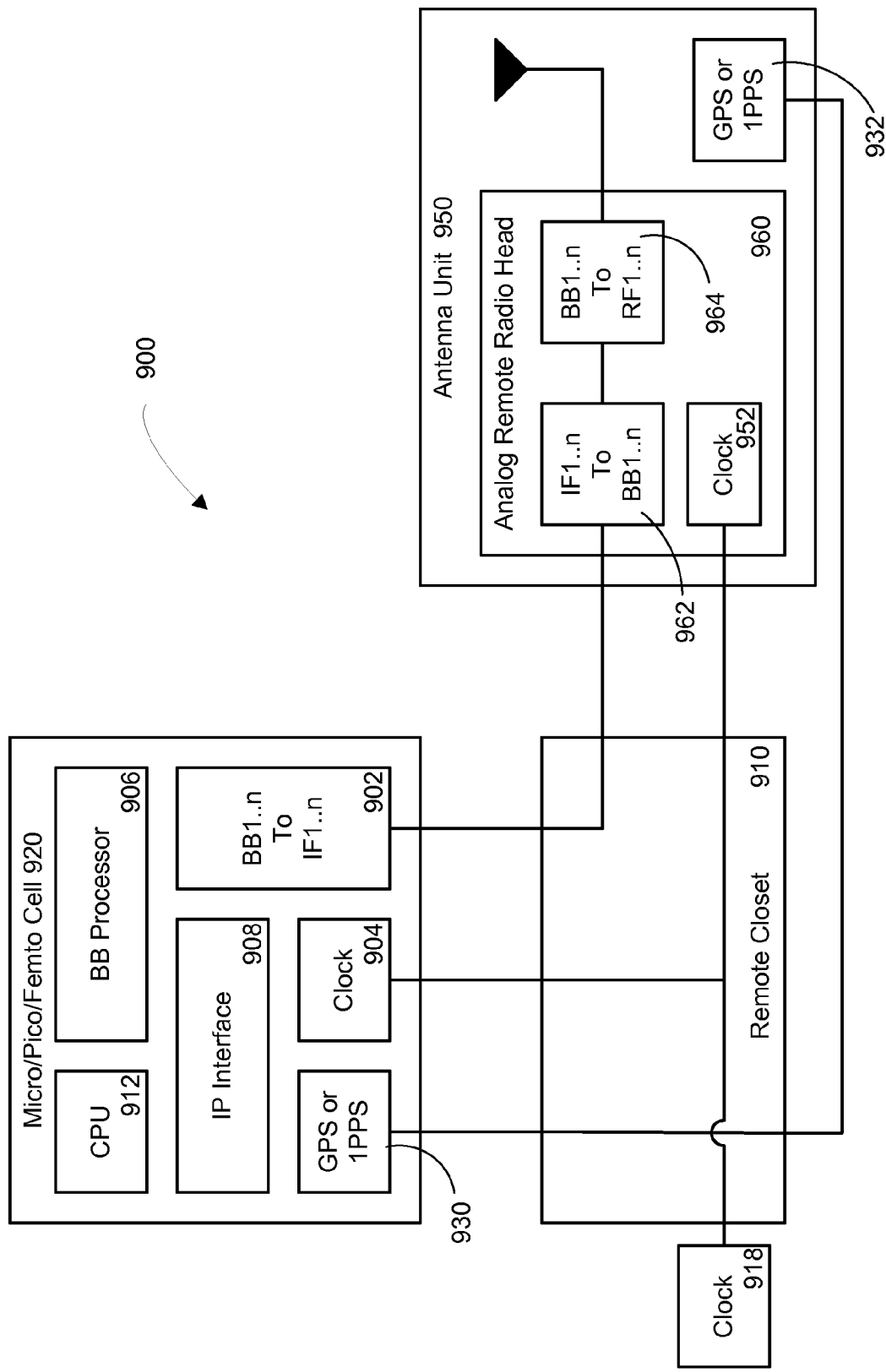
FIG. 9 is a block diagram of a DAS according to one aspect of the invention.

FIG. 9 shows a DAS 900 according to an alternative embodiment of the invention. Similar to FIGS. 3-8, DAS 900 can include a remote wiring closet 910 including one or more wiring closet or combining units (not shown) and other components of the DAS. DAS 900 can include a low cost Micro, Pico or Femto Cell 920 and an antenna unit 950 that includes an analog remote radio head 960. Similar to interface 700, the Micro, Pico or Femto Cell 920 can include a baseband to intermediate frequency signal (BB-IF) converter 902, a reference clock input PLL 904, a baseband processor 906, an IP interface 908, a CPU 912 and a GPS receiver (or 1 pps source) 930. The BB-IF signal converter 902 converts baseband signal received over the IP interface 908 to intermediate frequency signals for transmission over the DAS to the antenna units 950 and converts the IF signals received from the antenna units 950 to baseband signals for transmission over the DAS and through the IP interface 908 to the supporting service network. standard BB to RF chipset 964. The BB-IF signal converter 902 can use the same reference clock signal to synchronize the conversion from BB to IF and from IF to BB. The BB-IF signal converter 902 can be connected to BB Processor 906. The BB processor 906 can be used to process the baseband signals sent to and received from the BB-IF signal converter 902. The BB Processor can be connected to the IP Interface 908. The IP interface 908 can be used to connect the cell 920 to an IP network which carries the wireless service signals to be transferred over the DAS. The CPU 912 can be connected to the BB-IF signal converter 902, the BB Processor 906, the IP Interface 908 to monitor and/or control the operation of each of the components of the cell 920. The cell can support multiple sections to allow for more users or network connections as well as to provide for multiple MIMO streams.

As shown in FIG. 9, the DAS 900 can includes include one or more antenna units 950 that include one or more analog remote radio heads (ARRH) 960. Each ARRH 960 can include one or more multiplexed/de multiplexed IF-BB signal converters 962, one or more BB-RF signal converters 964 and a input reference clock PLL regenerator 952 The remote closet 910 can provide the same reference clock to both reference clock PLL regenerators 952, 904. In some embodiments of the invention, the reference clock signal can be used without further processing, such as by a reference clock PLL regenerator. The IF-BB signal converters 962 can be used to convert the IF signals used to carry the individual wireless services over the DAS 900 to the antenna unit 950 to BB signals and the BB-RF signal converters 964 can be used to convert the BB signals to RF signals for transmission by the antenna to the wireless terminal devices. In addition, the BB-RF signal converters 964 can be used to convert the RF signals received from the wireless terminal devices to BB signals and the IF-BB signal converters 962 can be used to convert the BB signals to IF signals used to carry the wireless signals through the DAS 900 to Source BTS (not shown). The BB-IF signal converters 902, the IF-BB signal converters 962 and the BB-RF signal converters 964 can include standard chipsets that are commercially available from for example MAXIM Integrated Products, Sunnyvale, Calif. and Analog Devices, Inc., Norwood, Mass. In addition, the bidirectional BB-IF 902 and the IF-BB 962 convertors can have the capability to provide automatic gain compensation to compensate for varying cable losses within the DAS. In addition, the BB receiver of the BB-IF and IF-BB signal converters can provide additional capabilities including DC offset compensation between the I,Q components of the signals and a tunable Low Pass Filter (LPF) to improve the channel separation from other services and provide, per channel, noise level filtering. The ARRH 960 can use the reference timing signal provided by the reference clock source 952 to synchronize the conversion of the signals. The reference clock source 952 can be a clock signal re-generator component that re-generates the reference clock signal that is distributed through the DAS 900. The reference clock signal can be generated by a primary reference clock signal generator 918 connected to the main wiring closet or the remote wiring closet 910 and distributed over the DAS 900 using one or more of the unused frequency bands or channels carried by the DAS 900. Alternatively, the reference clock signal can be generated by a component of the Pico or Femto Cell 920 and transferred to the remote wiring closet 910 and distributed to the other components of the DAS 900, including the antenna units 950, other Pico or Femto Cells and the main wiring closet.

The DAS 900 can also include a 1 pps signal. In one embodiment of the invention, the 1 pps signal can be generated by GPS receiver (or an envelope detector) 930 as part of the Micro, Pico or Femto Cell 920 and distributed over the DAS 900 to antenna unit 950 where it is received by a component 932 of the antenna unit 950 that regenerates, extracts or recovers the 1 pps signal from a signal received from the DAS 900. The 1 pps signal can distributed over the DAS 900 using one or more unused frequency bands or channels carried by the DAS 900. The 1 pps source 930 and 932 can be a component that derives the 1 ppm signal from the 1.5 GHz GPS signal received from an antenna or over the DAS, or alternatively, the 1 pps source 930 and 932 can be a component that includes a synthesizer and/or a phase lock loop that regenerates, extracts or recovers the 1 pps signal from a received signal distributed over the DAS 900. In an alternative embodiment, the GPS receiver (or envelope detector) 932 can be located with the antenna unit 950 and the 1 pps signal or a signal carrying the 1 pps signal can be sent over the DAS 900 to the other components of the DAS including Pico or Femto Cell 920.

Figure 10:
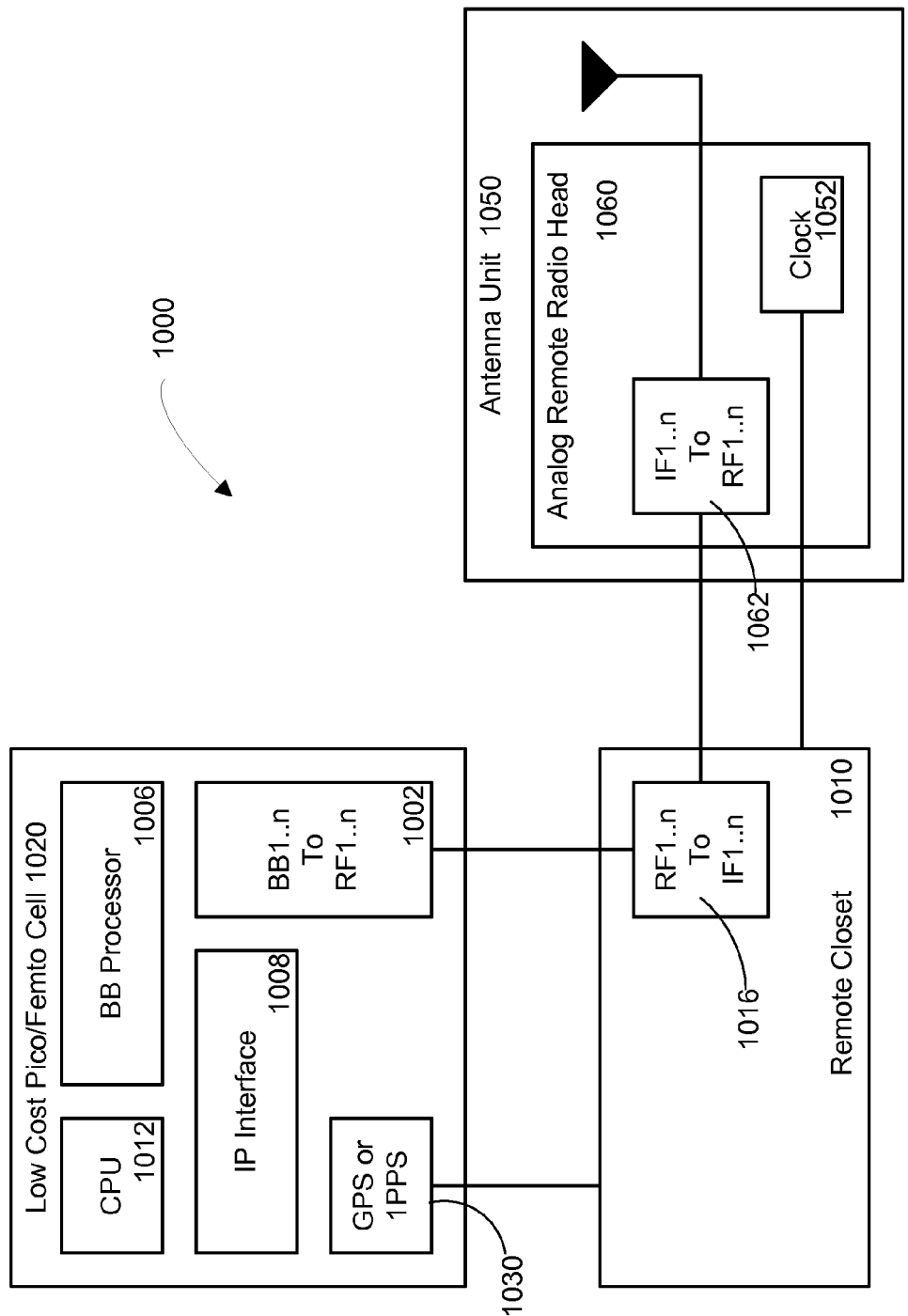
FIG. 10 is a block diagram of a DAS according to one aspect of the invention.

FIG. 10 shows a DAS 1000 according to an alternative embodiment of the invention. Similar to FIG. 9, DAS 1000 can include a remote wiring closet 1010 including one or more wiring closet or combining units (not shown) and other components of the DAS. DAS 1000 can include a low cost Pico or Femto Cell 1020 and an antenna unit 1050 that includes an analog remote radio head 1060. Similar to interface 920 and 700, the low cost Micro, Pico or Femto Cell 1020 can include a baseband to radio frequency signal converter 1002, a reference clock source 1004, a baseband processor 1006, an IP interface 1008, a CPU 1012 and a GPS receiver (or 1 pps source) 1030. The BB-RF signal converter 1002 converts the baseband signal received over the IP interface 1008 to RF signals for transmission over the DAS to the antenna units 1050 and converts the RF signals received from the antenna units 1050 to baseband signals for transmission through the IP interface to the supporting service network. The BB-RF signal converter 1002 can use the reference clock signal to synchronize the conversion from BB to RF and RF to BB. The BB-RF signal converter 1002 can be connected to BB Processor 1006. The BB processor 1006 can be used to process the baseband signals sent to and received from the BB-RF signal converter 1002. The BB Processor 1006 can be connected to the IP Interface 1008. The IP interface 1008 can be used to connect the cell 1020 to an IP network which carries the wireless service signals to be transferred over the DAS. The CPU 1012 can be connected to the BB-RF signal converter 1002, the BB Processor 1006, the IP Interface 1008 to monitor and/or control the operation of each of the components of the cell 1020. The cell can support multiple sections to allow for more users or network connections as well as to provide for multiple MIMO streams.

In the embodiment shown in FIG. 10, the remote closet 1010 can include one or more bidirectional multiplexed/demultiplexed RF to IF signal converter 1016 that can be used to convert the RF signals received from the Cell 1020 to IF signals for transmission to the ARRH 1060 (update the drawing) of antenna unit 1050 and to convert IF signals received from the ARRH 1060 of the antenna unit 1050 to RF signals for transmission to the Cell 1020. In addition the bidirectional RF to IF 1016 and the IF to RF 1062 convertors can have the capability to provide automatic gain compensation to compensate for varying cable losses in the DAS 1000. This embodiment of the invention would allow the use of conventional Micro, Pico and Femto Cells 1020 to be connected to the DAS 1000.

Similar to FIG. 9, the 1 pps signal provided by either a GPS receiver (or an envelope detector) 1030 or a reference clock source connected to the main closet or the remote closet 1010 can be distributed over the DAS 1000 to the PLL 1052 in the antenna unit 1050

It is noted that in various drawing figures, more than one cable appears to connect the components of the DAS, for example in FIGS. 9 an 10, multiple connections are shown between the remote closet 910, 1010 and the Cell 920, 1020 or antenna unit 950, 1050. In accordance with the invention, only one physical cable is needed to convey the described signals, although in alternative embodiments of the invention more than one cable can be used. In addition, the cables disclose herein can any medium that can be used to transfer a signal from one location to another and that combinations of cable types can be used. The cables can be electrical or optical or radio frequency conducting media.

The 1 pps signal can be converted or encoded onto another signal that is transferred through the DAS on the same cable or medium that is used to transfer the wireless services. In accordance with one embodiment of the invention, the 1 pps signal can be converted or encoded onto any unused frequency that can be transferred by the DAS. In one embodiment, the 1 pps signal is converted to a 20-50 MHz signal for transmission through the metallic cable media of the DAS and converted to 1.5-1.6 GHz for transmission through the optical cable media of the DAS. In general, the 1 pps signal can be carried on any band below 100 MHz over metallic cable media and can be carried on any band above 1.0 GHz over optical cable media.

The reference clock signal can be converted or encoded onto another signal that is transferred through the DAS on the same cable or medium that is used to transfer the wireless services. In accordance with one embodiment of the invention, the reference clock signal can be, for example, an Oven Controlled Crystal Oscillator (OCXO) at 10-20 Mhz signal that is converted or encoded onto any unused frequency that can be transferred by the DAS. In one embodiment, the reference clock signal is converted to a 1.5-2.0 Ghz signal for transmission through the DAS.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

What is claimed is:

1. A distributed antenna system, comprising:
    at least one wireless source coupled to at least one wiring unit, the at least one wireless source providing signals corresponding to a first wireless service over the distributed antenna system;
    a plurality of cable runs each including electrical radio frequency conducting media and connecting the at least one wiring unit to a plurality of antenna units, the cable runs connecting the at least one wiring unit to at least one of the antenna units and transferring signals corresponding to at least one wireless service between the at least one wiring unit and at least one of the antenna units;
    an interface adapted to connect a second wireless source providing a second wireless service to the distributed antenna system and transfer signals corresponding to the second wireless service over the distributed antenna system; and
    a reference clock connected to the distributed antenna system and adapted to produce and send a reference timing signal over the distributed antenna system.

2. The distributed antenna system of claim 1, further comprising the second wireless source connected to the interface.

3. The distributed antenna system of claim 2, further comprising an envelope detector connected to the distributed antenna system and adapted to receive a signal corresponding to a wireless service and produce a timing signal, the timing signal being transferred over the distributed antenna system.

4. The distributed antenna system of claim 3, wherein the envelope detector is connected to the second wireless source and adapted to transfer the timing signal to the interface.

5. The distributed antenna system of claim 4, wherein the envelope detector transfers a 1 pulse per second timing signal to the interface.

6. The distributed antenna system of claim 5, wherein the timing signal is transferred over the distributed antenna system to at least one of the antenna units and used by the antenna unit to synchronize an operation of the antenna unit.

7. The distributed antenna system of claim 2, wherein first wireless service comprises voice services.

8. The distributed antenna system of claim 3, wherein the timing signal is modulated onto a carrier signal and transferred over the distributed antenna system using the carrier signal.

9. The distributed antenna system of claim 3, wherein the timing signal is transferred over the distributed antenna system to at least one antenna unit and used by the antenna unit to synchronize an operation of the antenna unit.

10. The distributed antenna system of claim 2, further comprising a micro cell providing a second wireless source and wherein the micro cell includes the GPS receiver.

11. A distributed antenna system, comprising:
a first combining unit;
a plurality of cable runs each including electrical radio frequency conducting media and connecting the first combining unit to a plurality of antenna units;
the first combining unit including a base station connection capable of connecting a base station to the first combining unit, the first combining unit being capable of transferring signals corresponding to a first wireless service between the base station and at least one of the cable runs;
at least one wireless service access point connected to the first combining unit, the first combining unit being capable of transferring signals corresponding to a second wireless service between the at least one wireless access point and at least one of the cable runs;
a first interface module connected to the wireless service access point and capable of converting a control signal sent from the wireless service access point to an intermediate frequency (IF) control signal and transferring the IF control signal between the wireless service access point and the first combining unit; and
a second combining unit connected to at least one of the cable runs and capable of receiving the IF control signal and converting the IF control signal back to the control signal and transferring the control signal to at least one of the antenna units of the distributed antenna system.

12. The distributed antenna system of claim 11, further comprising a reference clock signal generator connected to the first combining unit and capable of generating a reference clock signal, the first combining unit being capable of receiving the reference clock signal and transmitting the reference clock signal over at least one of the cable runs to at least one of the antenna units.

13. The distributed antenna system of claim 12, wherein the first combining unit is capable of transferring the IF control signal between the first interface module and at least one of the cable runs.

14. The distributed antenna system of claim 13, wherein the first combining unit uses the reference clock signal to convert a signal received from the access point corresponding to the second wireless service to an intermediate frequency signal and transfers the intermediate frequency signal over at least one of the cable runs to at least one of the antenna units.

15. A distributed antenna system comprising:
at least one wiring unit;
a first wireless source connected to the at least one wiring unit, the first wireless source providing signals corresponding to a first wireless service over the distributed antenna system;
a plurality of antenna units;
a plurality of cable runs each including electrical radio frequency conducting media connecting the at least one wiring unit to the plurality of antenna units and transferring signals corresponding to at least one wireless service between the at least one wiring unit and the antenna units;
a second wireless source;
an interface adapted to connect the second wireless source to provide a second wireless service to the distributed antenna system and transfer signals corresponding to the second wireless service over the distributed antenna system;
a GPS receiver adapted to receive a GPS signal and produce a timing signal, the timing signal being transferred over the distributed antenna system, wherein the GPS receiver is connected to the second wireless source and adapted to transfer the timing signal to the interface; and
a reference clock connected to the distributed antenna system and adapted to produce and send a reference timing signal over the distributed antenna system.

* * * * *